(12) United States Patent
Molter et al.

(10) Patent No.: US 10,100,647 B2
(45) Date of Patent: Oct. 16, 2018

(54) TURBINE AIRFOIL WITH CAST PLATFORM COOLING CIRCUIT

(71) Applicant: GENERAL ELECTRIC COMPANY, Schenectady, NY (US)

(72) Inventors: Stephen Mark Molter, Cincinnati, OH (US); Mark Edward Stegemiller, West Chester, OH (US); Shawn Michael Pearson, West Chester, OH (US); Steven Robert Brassfield, West Chester, OH (US)

(73) Assignee: General Electric Company, Schenectady, NY (US)

( * ) Notice: Subject to any disclaimer, the term of this patent is extended or adjusted under 35 U.S.C. 154(b) by 269 days.

(21) Appl. No.: 14/406,018

(22) PCT Filed: Jun. 17, 2013

(86) PCT No.: PCT/US2013/046113
§ 371 (c)(1),
(2) Date: Dec. 5, 2014

(87) PCT Pub. No.: WO2013/188869
PCT Pub. Date: Dec. 19, 2013

(65) Prior Publication Data
US 2015/0152735 A1 Jun. 4, 2015

Related U.S. Application Data

(60) Provisional application No. 61/660,183, filed on Jun. 15, 2012.

(51) Int. Cl.
*F01D 5/18* (2006.01)
*B23P 15/02* (2006.01)
(Continued)

(52) U.S. Cl.
CPC .............. *F01D 5/186* (2013.01); *B23P 15/02* (2013.01); *F01D 5/187* (2013.01); *F01D 5/20* (2013.01);
(Continued)

(58) Field of Classification Search
CPC . F01D 5/186; F01D 5/187; F01D 5/20; F01D 5/225; F01D 9/041; F05D 2220/32;
(Continued)

(56) References Cited

U.S. PATENT DOCUMENTS 3,610,769 A 10/1971 Schwedland et al.
3,628,880 A 12/1971 Smuland et al.
(Continued)

FOREIGN PATENT DOCUMENTS

CN 1782329 A 6/2006
EP 1621725 A1 2/2006
(Continued)

OTHER PUBLICATIONS

International Search Report and Written Opinion dated May 8, 2013 which was issued with PCT Patent Application No. PCT/US13/46113 which was filed on Jun. 17, 2013.
(Continued)

*Primary Examiner* — Aaron R Eastman
(74) *Attorney, Agent, or Firm* — General Electric Company; William Andes

(57) ABSTRACT

A turbine airfoil apparatus includes: an airfoil including a concave pressure sidewall and a convex suction sidewall joined together at a leading edge and a trailing edge; an endwall projecting laterally outwardly from the airfoil at one spanwise end thereof, the endwall having an outer surface facing the airfoil and an opposing inner surface; a plenum defined within the endwall between the inner and outer surfaces wherein the plenum is forked in plan view, with at
(Continued)

least two branches, each branch having a throat disposed at its upstream end; and at least one film cooling hole passing through the outer surface and communicating with the plenum.

2 Claims, 4 Drawing Sheets

(51) Int. Cl.
    *F01D 5/20* (2006.01)
    *F01D 5/22* (2006.01)
    *F01D 9/04* (2006.01)

(52) U.S. Cl.
    CPC .............. *F01D 5/225* (2013.01); *F01D 9/041* (2013.01); *F05D 2220/32* (2013.01); *F05D 2230/10* (2013.01); *F05D 2230/21* (2013.01); *F05D 2240/81* (2013.01); *F05D 2260/202* (2013.01); *Y10T 29/49341* (2015.01)

(58) Field of Classification Search
    CPC ............. F05D 2230/10; F05D 2230/21; F05D 2240/81; F05D 2260/202
    USPC ....................................... 416/97 R
    See application file for complete search history.

(56) References Cited

U.S. PATENT DOCUMENTS

| | | | | |
|---|---|---|---|---|
| 5,358,374 | A * | 10/1994 | Correia | F01D 5/081 415/115 |
| 5,813,835 | A | 9/1998 | Corsmeier et al. | |
| 6,132,173 | A * | 10/2000 | Tomita | F01D 5/187 415/114 |
| 6,783,323 | B2 | 8/2004 | Shiozaki et al. | |
| 7,144,215 | B2 | 12/2006 | Keith et al. | |
| 7,163,376 | B2 | 1/2007 | Itzel et al. | |
| 7,198,467 | B2 | 4/2007 | Keith et al. | |
| 7,255,536 | B2 | 8/2007 | Cunha et al. | |
| 7,416,391 | B2 | 8/2008 | Veltre et al. | |
| 7,513,318 | B2 | 4/2009 | Underwood et al. | |
| 7,513,738 | B2 * | 4/2009 | Itzel | F01D 5/187 415/115 |
| 7,625,172 | B2 * | 12/2009 | Walz | F01D 5/186 415/115 |
| 8,523,527 | B2 | 9/2013 | Lacy et al. | |
| 2005/0100437 | A1 * | 5/2005 | Phillips | F01D 5/147 415/115 |
| 2006/0024151 | A1 * | 2/2006 | Keith | F01D 5/081 415/97 |
| 2007/0116574 | A1 * | 5/2007 | Itzel | F01D 5/082 416/193 A |
| 2009/0232660 | A1 | 9/2009 | Liang | |
| 2010/0129196 | A1 * | 5/2010 | Johnston | F01D 5/188 415/115 |
| 2010/0232975 | A1 * | 9/2010 | Morris | F01D 5/187 416/232 |
| 2010/0316486 | A1 | 12/2010 | Townes | |
| 2011/0123310 | A1 * | 5/2011 | Beattie | F01D 5/18 415/115 |
| 2012/0082564 | A1 * | 4/2012 | Ellis | F01D 5/081 416/97 R |
| 2012/0082566 | A1 * | 4/2012 | Ellis | F01D 5/087 416/97 R |
| 2012/0107134 | A1 * | 5/2012 | Harris, Jr. | F01D 5/081 416/97 R |
| 2015/0285097 | A1 * | 10/2015 | Spangler | F01D 25/12 415/116 |

FOREIGN PATENT DOCUMENTS

| | | |
|---|---|---|
| JP | 54826086 B1 | 8/1973 |
| JP | 11236805 A | 8/1999 |
| JP | 2003027902 A | 1/2003 |
| JP | 2006329185 A | 12/2006 |
| JP | 2007224919 A | 9/2007 |

OTHER PUBLICATIONS

Unofficial English Translation of Chinese Office Action issued in connection with corresponding CN Application No. 201380031535.9 dated Jun. 3, 2015.

Unofficial English translation of Office Action issued in connection with corresponding JP Application No. 2015-517478 dated May 9, 2017.

* cited by examiner

TURBINE AIRFOIL WITH CAST PLATFORM COOLING CIRCUIT

BACKGROUND OF THE INVENTION

The present invention relates to gas turbine engines and, more particularly, to methods and apparatus for cooling endwalls of turbine airfoils.

In a gas turbine engine, hot gas exits a combustor and is utilized by a turbine for conversion to mechanical energy. This mechanical energy drives an upstream high pressure compressor. The turbine comprises a plurality of rows of blades which are carried by a turbine rotor, alternating with rows of stationary nozzles. The turbine blades and nozzles are subjected to a flow of the corrosive, high-temperature combustion gases. These "hot section" components are typically cooled by a flow of relatively low-temperature coolant, such as air extracted (bled) from the compressor.

As turbine inlet temperatures in modern gas turbine engines continue to rise, the endwalls of the hot section components (i.e. turbine blade platforms and nozzle bands) become more difficult to cool with traditional techniques. In addition, advanced aerodynamic features such as endwall contouring put extra pressure on maintaining acceptable material temperatures.

The current state of the art is to drill film holes through the endwalls, to be fed by cooling air beneath the component. As a result, holes can only be placed in certain regions where they can be completely drilled to the other side or where the gas path pressure is low enough since the cooling air pressure feeding these holes is much lower than the airfoil cooling air.

Some designs use hollow platforms that feed compressor bleed air to film cooling holes, but these designs are generally not adaptable to providing different cooling hole patterns based on varying operating conditions.

Accordingly, there is a need for a turbine airfoil platform with improved cooling.

BRIEF DESCRIPTION OF THE INVENTION

This need is addressed by the present invention, which provides a turbine airfoil having a cooling circuit cast therein. The cooling circuit can include various patterns of cooling holes.

According to one aspect of the invention, a turbine airfoil apparatus includes: an airfoil including a concave pressure sidewall and a convex suction sidewall joined together at a leading edge and at a trailing edge; an endwall that projects laterally outwardly from the airfoil at one spanwise end thereof, the endwall having an outer surface facing the airfoil and an opposing inner surface; a plenum defined within the endwall between the inner and outer surfaces wherein the plenum is forked in plan view, with at least two branches, each branch having a throat disposed at its upstream end; and at least one film cooling hole passing through the outer surface and communicating with the plenum.

According to another aspect of the invention, a is provided method of making a cooling hole pattern in a turbine airfoil apparatus that includes: an airfoil including a concave pressure sidewall and a convex suction sidewall joined together at a leading edge and at a trailing edge; an endwall that projects laterally outwardly from the airfoil at one spanwise end thereof, the endwall having an outer surface facing the airfoil and an opposing inner surface; and a plenum defined within the endwall between the inner and outer surfaces wherein the plenum is forked in plan view, with at least two branches, each branch having a throat disposed at its upstream end; the method comprising machining through the outer surface so as to define at least one film cooling hole communicating with the plenum.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
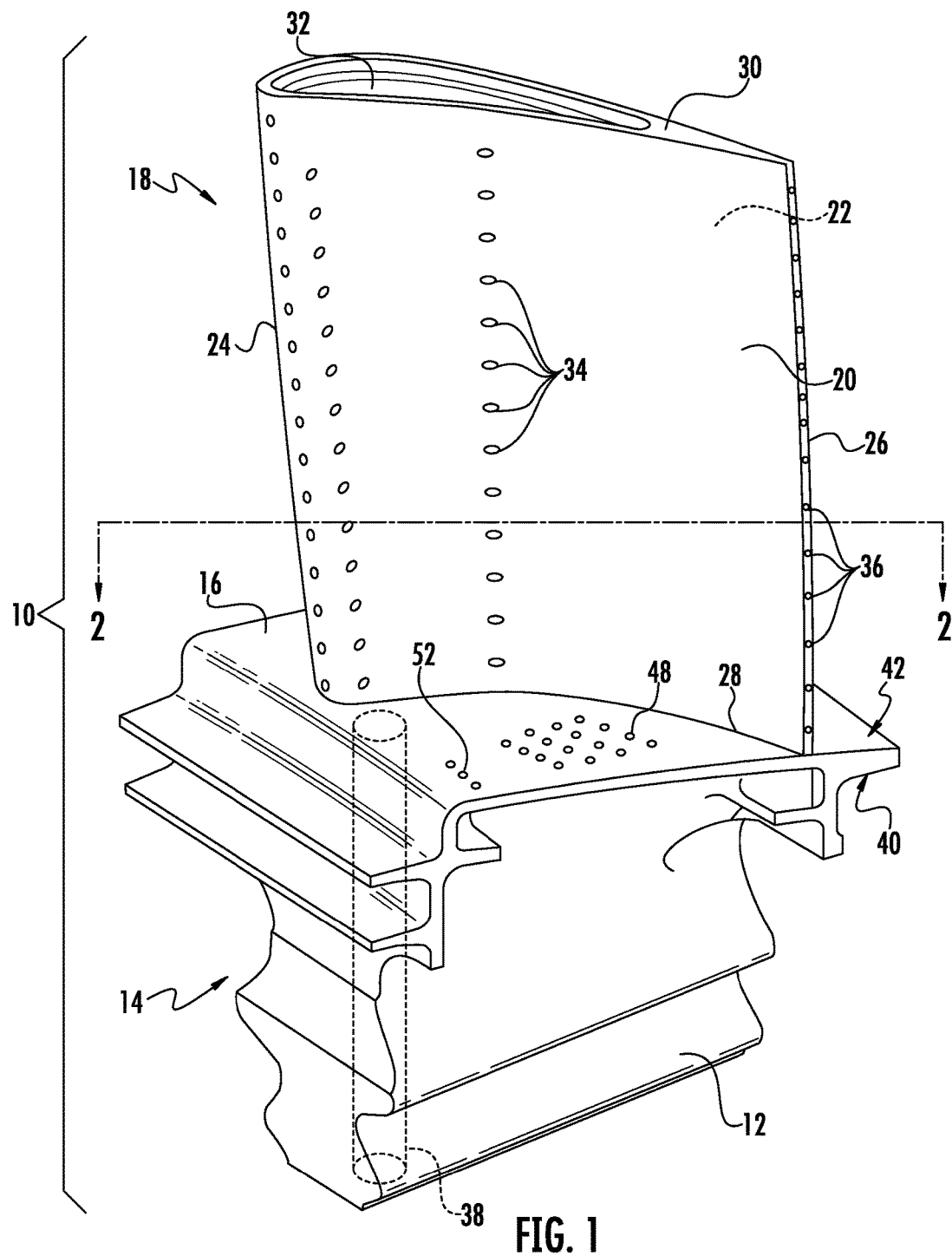
FIG. 1 is a schematic perspective view of a turbine blade constructed in accordance with an aspect of the present invention.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to a disk as it rotates during operation. A blade shank 14 extends radially upwardly from the dovetail 12 and terminates in a platform 16 that projects laterally outwardly from and surrounds the shank 14. The platform 16 may be considered a species of "endwall." A hollow airfoil 18 extends radially outwardly from the platform 16 and into the hot gas stream. The airfoil 18 has a concave pressure sidewall 20 and a convex suction sidewall 22 joined together at a leading edge 24 and at a trailing edge 26. The airfoil 18 extends from a root 28 to a tip 30, and may take any configuration suitable for extracting energy from the hot gas stream and causing rotation of the rotor disk. The pressure sidewall 20 and the suction sidewall 22 extend radially outward beyond a tip cap 32 to define a structure generally referred to as a "squealer tip."

The blade 10 may be formed as a one-piece casting of a suitable superalloy, such as a nickel-based superalloy, which has acceptable strength at the elevated temperatures of operation in a gas turbine engine. At least a portion of the airfoil 18 may be coated with a protective coating of a known type, such as an environmentally resistant coating, or a thermal barrier coating, or both.

The interior of the airfoil 12 is hollow and may include any one of a number of known cooling configurations including, for example, parallel radial or serpentine flow channels with various structures such as turbulators formed therein for improving cooling air effectiveness. The spent cooling air from the airfoil interior may be discharged through film cooling holes 34 and trailing edge discharge holes 36. The cooling air is fed to the airfoil 18 through one or more feed channels 38 extending through the dovetail 12 and shank 14 into the airfoil 18.

Figure 2:
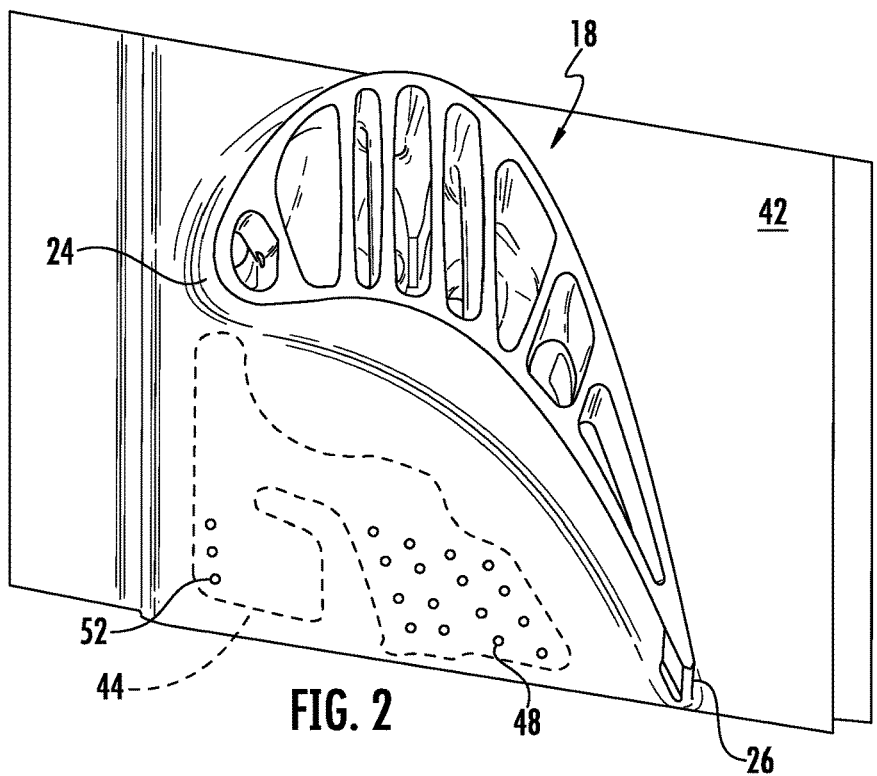
FIG. 2 is a view taken along lines 2-2 of FIG. 1.
Figure 3:
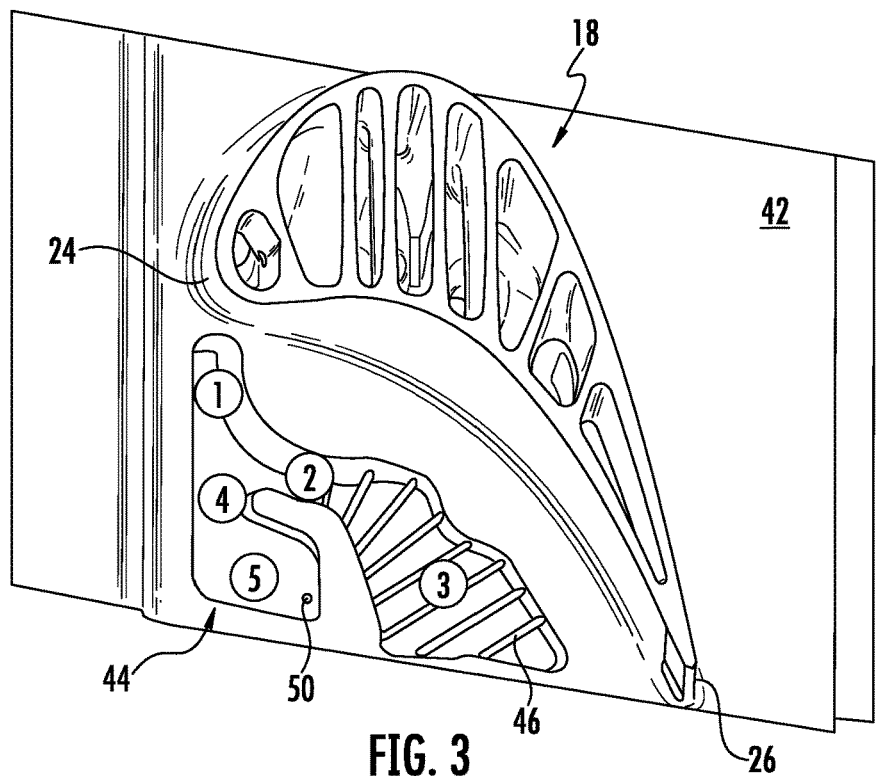
FIG. 3 is a partially cut-away view of the turbine blade shown in FIG. 2.

The platform 16 includes an inner surface 40 and an outer surface 42. A plenum 44 (see FIGS. 2 and 3) is formed unitarily within the platform 16. The periphery of the plenum 44 is defined and bounded by the inner and outer surfaces 40 and 42, and by internal walls spanning the gap between the inner and outer walls 40 and 42. The plenum 44 is formed as a part of the blade 10 using a known casting process.

The plenum 44 includes, in sequence in a generally axial direction from front to rear, a first region 1, a second region 2, and a third region 3. The cross-sectional area of the plenum 44 generally increases from front to rear. A fourth region 4 is disposed in flow communication with the first region 1. A fifth region 5 is disposed in flow communication with the fourth region 4 and is disposed axially forward of the third region 3. The overall shape of the plenum may be described as "forked" or "branched" in plan view, with the second and third regions 2 and 3 defining one branch and the fourth and fifth regions 4 and 5 defining a second branch. As will be explained in more detail below, each branch of the plenum 44 includes a throat- or nozzle-type structure at its upstream end.

During engine operation, cooling air enters the dovetail 12 through the feed channel 38. The first region 1 of the plenum 44 is fed cooling air by the feed channel 38. Cooling air then flows from the first region 1 into the connected second region 2. The second region 2 is the main region where convective cooling of the platform 16 takes place. The second region 2 has a relatively constricted flow area, seen as a reduced width or lateral dimension in FIGS. 2 and 3. This functions as a throat or nozzle to increase flow velocity and thereby enhance the heat transfer to the external surface of the platform 16. The location (i.e. its position in the axial and tangential directions) of the second region 2 may be selected to correspond with the location on the platform 16 expected to experience the highest temperatures during engine operation. This may be determined by analysis or by testing. After being used for convective cooling in the second region 2, the cooling air flows to the third region 3. The third region 3 may be provided with internal heat transfer enhancement features such as ribs, fins, pins, or the like. In the illustrated example it includes a plurality of spaced-apart turbulence promoters or "turbulators" 46. The cooling air exits the third region 3 through a plurality of film cooling holes 48 (best seen in FIG. 2). The number, size, and location of the film cooling holes 48 is selected to discharge a protective film of cooling air over a portion of the platform 16. As used herein, the term "film cooling hole" refers to a hole which is sized to discharge a film of cooling air over a surface, so as to protect the surface from high-temperature flowpath gases. While the exact dimensions will vary with the specific design, those skilled in the art will recognize a distinction between a "film cooling hole" and other types of holes, such as "impingement cooling holes" and "purge holes".

The film cooling holes 48 may be formed by known methods such as conventional drilling, laser drilling, or electrical discharge machining (ECM). These methods are referred to generically herein as "machining."

The flow path for cooling air from the first region 1 to the third region 3 extends in a direction generally parallel to a line between the leading edge 24 to the trailing edge 26.

The first region 1 also communicates with the fourth region 4. Like the second region 2, the fourth region 4 has a relatively constricted flow area, seen as a reduced width or lateral dimension in FIGS. 2 and 3. This functions as a throat or nozzle to increase flow velocity and thereby enhance the heat transfer to the external surface of the platform 16. After being used for convective cooling in the fourth region 4, the cooling air flows to the fifth region 5. The fifth region 5 is generally rectangular in plan view and is positioned axially forward of the third region 3. In operation, some cooling air from the first region 1 enters the fifth region 5. One or more purge holes 50 may be provided in the fifth region 5, exhausting into the secondary flowpath inboard of the platform 16 (through inner surface 40). The purge hole 50 permits a small amount of flow to exit the fifth region 5, thereby preventing flow stagnation and build-up of debris in the fifth region 5. The presence of the fourth region 4 reduces the weight of the blade 10. Furthermore, the fourth region 4 provides a means by which the cooling configuration of the blade 10 can be revised and/or upgraded without changes to the basic casting. For example, the purge hole 50 could be eliminated by plugging it (e.g. using brazing or welding techniques), and one or more of film cooling holes 52 (see FIG. 2) may be drilled through the surface of the platform 16 connecting to the fourth region 4.

Figure 4:
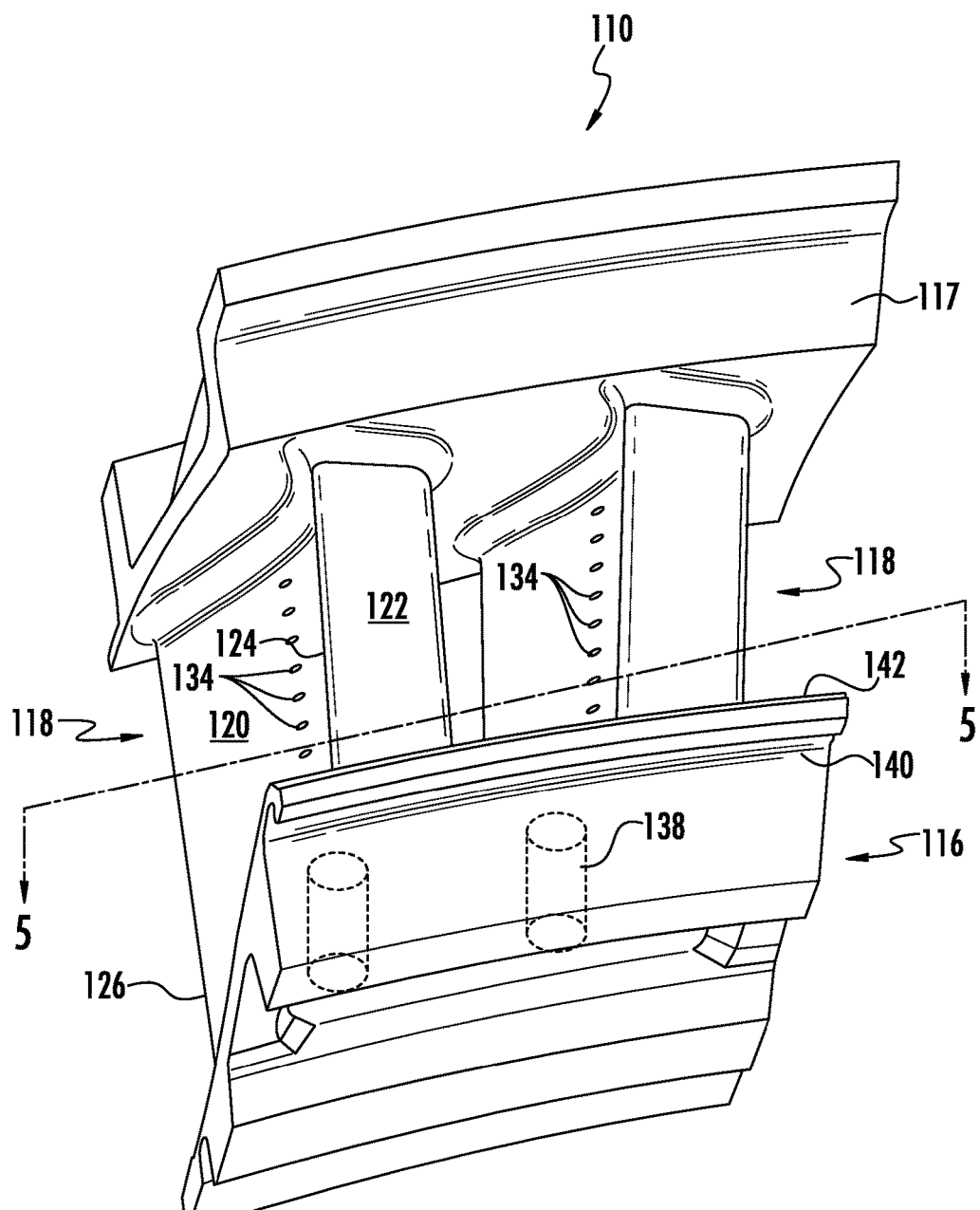
FIG. 4 is a schematic perspective view of a turbine nozzle constructed in accordance with an aspect of the present invention.
Figure 5:
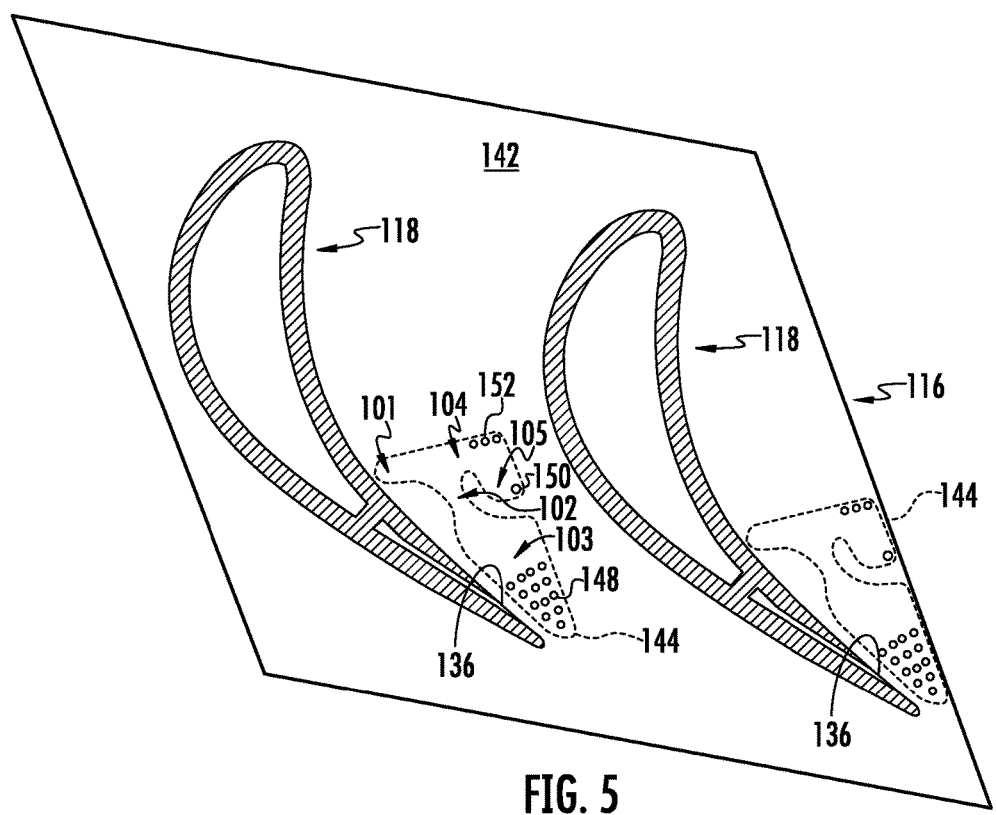
FIG. 5 is a view taken along lines 5-5 of FIG. 4.

The principles described above may be applied to other types of airfoil structures as well. For example, FIGS. 4 and 5 illustrate an exemplary turbine nozzle 110. The turbine nozzle 110 includes a pair of hollow airfoils 118 extending in a radial direction between an arcuate inner band 116 and an arcuate outer band 117. Like the platform 16 described above, the inner and outer bands 116 and 117 may each be considered a species of "endwall." Each airfoil 118 has a concave pressure sidewall 120 and an opposed convex suction sidewall 122 joined together at a leading edge 124 and at a trailing edge 126. The airfoils 118 may take any configuration suitable for directing a hot gas stream to a downstream row of rotating turbine blades (not shown). The turbine nozzle 110 may be formed as a one-piece casting of a suitable superalloy, such as a nickel-based superalloy, which has acceptable strength at the elevated temperatures of operation in a gas turbine engine. At least a portion of the turbine nozzle 110 may be coated with a protective coating of a known type, such as an environmentally resistant coating, or a thermal barrier coating, or both.

The interior of the airfoils 118 are hollow and may include any one of a number of known cooling configurations including, for example, parallel radial or serpentine flow channels with various structures such as turbulators formed therein for improving cooling air effectiveness. The spent cooling air from the airfoil interior may be discharged through film cooling holes 134 and trailing edge discharge openings 136. The cooling air is fed to the airfoil 118 through one or more feed channels 38 extending through the inner band 116 into the airfoil 118.

The inner band 116 includes an inner surface 140 and an outer surface 142. A plenum 144 (see FIG. 5) is formed unitarily within the inner band 116 (optionally, the outer band 117 could include a plenum). The periphery of the plenum 144 is defined and bounded by the inner and outer surfaces 140 and 142, and by internal walls spanning the gap between the inner and outer surfaces 140 and 142. The plenum 144 is formed as a part of the turbine nozzle 110 using a known casting process.

The plenum 144 is similar in construction to the plenum 44 described above. It includes a first region 101, a second region 102, a third region 103, a fourth region 104, and a fifth region 105. is The overall shape of the plenum 144 may be described as "forked" or "branched" in plan view, with the second and third regions 102 and 103 defining one branch and the fourth and fifth regions 104 and 105 defining a second branch. Each branch of the plenum 144 includes a throat- or nozzle-type structure at its upstream end. More specifically, the second region 102 and the fourth region 104 each has a relatively constricted flow area, seen as a reduced width or lateral dimension. This functions as a throat or nozzle to increase flow velocity and thereby enhance the heat transfer to the outer surface 142 of the inner band 116.

Cooling air exits the third region 103 through a plurality of film cooling holes 148. The number, size, and location of the film cooling holes 148 is selected to discharge a protective film of cooling air over a portion of the inner band 116. One or more purge holes 150 may be provided in the fifth region 105, exhausting into the secondary flowpath inboard of the inner band 116. The purge hole 150 permits a small amount of flow to exit the fifth region 105, thereby preventing flow stagnation and build-up of debris in the fifth region 105.

Furthermore, the fifth region 105 provides a means by which the cooling configuration of the nozzle 110 can be revised and/or upgraded without changes to the basic casting. For example, the purge hole 150 could be eliminated by plugging it (e.g. using brazing or welding techniques), and one or more of film cooling holes 152 may be drilled through the surface of the inner band 116, connecting to the fifth region 105.

The cooling configuration described above eliminates the cooling restrictions in prior art hot section gas components, namely the location, orientation, and quantity of film cooling holes. With those restrictions removed, holes can be placed anywhere on the endwall, since a majority of it is now hollow and contains higher coolant pressure to ensure positive cooling flow. This design provides lower temperature air and increased flexibility in cooling design.

This design also provides the possibility of altering a component's cooling design without having to change the casting. For example, the same basic casting used to manufacture the turbine blade 10 described above could be machined with different patterns of film cooling holes communicating with the plenum 44, depending on the specific end use, design intent, and analytical techniques available at the time the blade is designed and manufactured.

The foregoing has described a turbine airfoil for a gas turbine engine. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A method of enhancing the cooling configuration of a turbine airfoil comprising:
   casting an airfoil comprising a concave pressure sidewall and a convex suction sidewall joined together at a leading edge and at a trailing edge, said airfoil comprising:
   at least one internal cast-in cooling passage;
   an endwall that projects laterally outwardly from the airfoil at one spanwise end thereof, the endwall having an outer surface facing the airfoil and an opposing inner surface;
   a plenum defined within the endwall between the inner and outer surfaces wherein the plenum is forked, with at least two branches, each branch having a throat disposed at its upstream end;
   at least one purge hole which fluidly connects the plenum to one or more secondary flowpaths inboard of the endwall;
   a flow characteristic; and
   a heat transfer characteristic; and
   performing a post-casting enhancement step to improve at least one of said flow and heat transfer characteristics of said airfoil, wherein the post-casting enhancement step results in a physical modification to the airfoil, the physical modification located in at least one of the two branches, downstream of the respective throat, and wherein the post-casting enhancement step includes plugging the at least one purge hole, using brazing or welding.

2. The method of claim 1, the plenum further comprising:
   a first region in flow communication with and upstream of said two branches;
   a second region disposed within said first branch and including a throat area of said first branch;
   a third region disposed within said first branch and fluidly fed from said second region;
   a fourth region disposed within said second branch including a throat area of said second branch and fluidly fed from said first region; and
   a fifth region disposed within said second brand and fluidly fed from said fourth region,
   wherein said post-casting enhancement step further comprises drilling a cooling hole,
   wherein said drilling a cooling hole fluidly connects the endwall outer surface to said third region, said fourth region or said fifth region, and
   wherein said drilling a cooling hole comprises drilling a cooling hole using electrical discharge machining.

* * * * *